US009338078B2

(12) United States Patent  (10) Patent No.: US 9,338,078 B2
Anand et al.  (45) Date of Patent: May 10, 2016

(54) TECHNIQUE TO MINIMIZE TRAFFIC LOSS ON A ROUTER RELOAD/RESTART

(71) Applicant: Cisco Technology, Inc., San Jose, CA (US)

(72) Inventors: Madhukar Anand, Fremont, CA (US); Hasmit Grover, Fremont, CA (US); Paul Wells, Eden Prairie, MN (US)

(73) Assignee: Cisco Technology, Inc., San Jose, CA (US)

( * ) Notice: Subject to any disclaimer, the term of this patent is extended or adjusted under 35 U.S.C. 154(b) by 301 days.

(21) Appl. No.: 13/800,419

(22) Filed: Mar. 13, 2013

(65) Prior Publication Data

US 2014/0269407 A1  Sep. 18, 2014

(51) Int. Cl.
*H04L 12/28* (2006.01)
*H04L 12/751* (2013.01)
*H04L 12/775* (2013.01)
*H04L 12/703* (2013.01)

(52) U.S. Cl.
CPC .............. *H04L 45/02* (2013.01); *H04L 45/28* (2013.01); *H04L 45/58* (2013.01)

(58) Field of Classification Search
None
See application file for complete search history.

(56) References Cited

U.S. PATENT DOCUMENTS

| 6,950,427 | B1* | 9/2005 | Zinin ............................ 370/386 |
| 2003/0123457 | A1* | 7/2003 | Koppol ......................... 370/400 |
| 2006/0010249 | A1* | 1/2006 | Sabesan et al. ................ 709/238 |
| 2012/0275456 | A1* | 11/2012 | Ammireddy ............ H04L 45/02 370/390 |
| 2013/0070604 | A1* | 3/2013 | Lu ........................ H04L 45/586 370/238 |

\* cited by examiner

*Primary Examiner* — Jutai Kao
(74) *Attorney, Agent, or Firm* — Campbell Stephenson LLP (57) ABSTRACT

A link state information correction scheme is implemented by the present disclosure. In one embodiment, the correction scheme is implemented by a reload logic module that cooperates with link state protocol logic configured on a reload routing element (or routing element that has reloaded or hard restarted). The reload logic module is configured to receive a database descriptor message at a reload routing element, where the database descriptor message is received from a neighbor routing element during an adjacency formation. The reload logic module is also configured to determine whether the database descriptor message identifies a stale version of a link state advertisement (LSA), where the LSA is self-originated by the reload routing element. The reload logic module is also configured to generate a new version of the LSA during the adjacency formation.

19 Claims, 8 Drawing Sheets

TECHNIQUE TO MINIMIZE TRAFFIC LOSS ON A ROUTER RELOAD/RESTART

TECHNICAL FIELD

The present disclosure relates generally to link state routing protocols, and more particularly, to a link state information correction technique that can minimize transient traffic losses due to stale routing information, in certain embodiments.

BACKGROUND

In order to perform packet routing in a network, routing elements use a routing protocol to exchange information about the network with one another, such as information about the network's topology. Using this information, the routing protocol is configured to determine various paths through the network to reach various destinations. If a change is made in the network that affects the network's topology, routing elements that continue to route packets in the network using the old paths (which do not reflect the new network topology) can cause transient packet loss.

BRIEF DESCRIPTION OF THE DRAWINGS

A more complete understanding of the present disclosure may be acquired by referring to the following description and accompanying drawings, in which like references numbers indicate like features.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents and alternative falling within the spirit and scope of the present disclosure as defined by the appended claims.

DETAILED DESCRIPTION

Overview

A link state information correction scheme is implemented by the present disclosure. In one embodiment, the correction scheme is implemented by a reload logic module that cooperates with link state protocol logic configured on a reload routing element (or routing element that has reloaded or hard restarted). The reload logic module is configured to receive a database descriptor message at a reload routing element, where the database descriptor message is received from a neighbor routing element during an adjacency formation. The reload logic module is also configured to determine whether the database descriptor message identifies a stale version of a link state advertisement (LSA), where the LSA is self-originated by the reload routing element. The reload logic module is also configured to generate a new version of the LSA during the adjacency formation.

Example Embodiments

Figure 1:
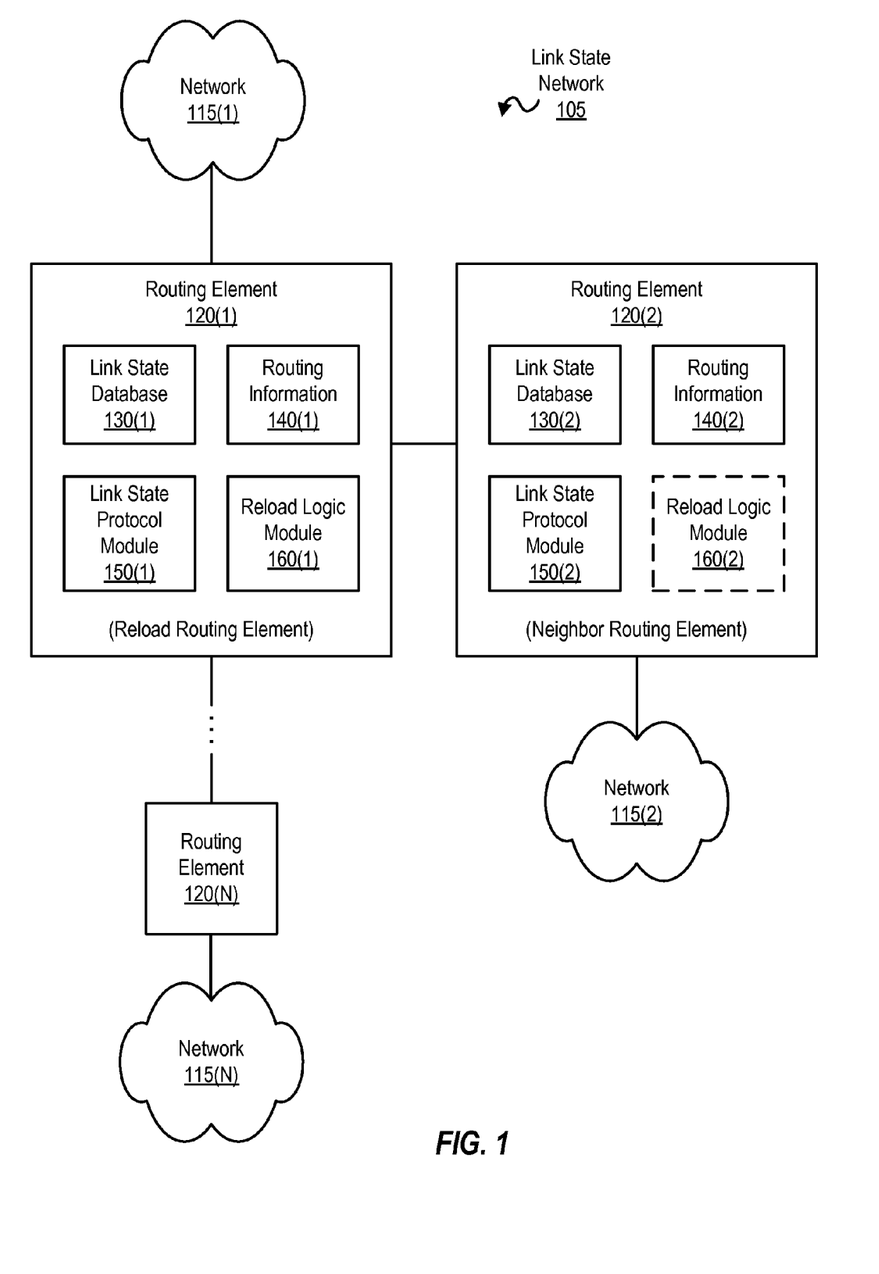
FIG. 1 is a block diagram illustrating components of an example network in which the present disclosure can be implemented, according to one embodiment.

FIG. 1 is a block diagram illustrating components of an example network 105 in which the present disclosure can be implemented. Link state network 105 is an autonomous system that supports IP (Internet Protocol) routing. Link state network 105 includes one or more networks 115(1)-(N) that are connected via routing elements 120(1)-(N). Each component is discussed in further detail below.

Routing elements 120(1)-(N) are representative of network elements that perform packet routing in a network, such as network 105. Routing elements 120(1)-(N) can each be identified by a routing element identifier (ID) (such as a 32-bit number assigned to a routing element that uniquely identifies the routing element in network 105), by a network address (such as a hard MAC (Media Access Control) address), an IP (Internet Protocol, such as IPv4 and IPv6) address, and/or other value that identifies the routing element.

Routing elements 120(1)-(N) implement a routing protocol and are configured to exchange information with each other about network 105. In the embodiments described herein, the routing protocol implemented in network 105 is a link state routing protocol. While the embodiments described herein include OSPF (Open Shortest Path First) protocol, other link state routing protocols can be used, such as IS-IS (Intermediate System to Intermediate System) protocol. Routing elements 120(1)-(N) are each configured with a link state routing protocol module 150 (also illustrated as more simply, link state protocol module 150) that implements a link state routing protocol (e.g., implements link state protocol logic).

Routing elements 120(1)-(N) that implement link state protocol module 150 are configured to exchange link state information that describes the network topology of network 105, where the link state information is included in a link state advertisement and flooded by a routing element to each of its neighbor routing elements. A link state advertisement (LSA) includes link state (or topology) information local to the routing element originating (e.g., generating) the LSA. Each routing element stores a copy of the most recent version of each LSA in a link state database 130 (e.g., a newer version of an LSA replaces an older version of the LSA). Link state database 130 stores link state (or topology) information that completely describes the links or paths connecting routing elements 120(1)-(N) in network 105.

An LSA identifies the links, routing elements, and/or networks that are coupled to the originating routing element, as well as the metric cost associated with each link. An LSA includes (and is identified by) a corresponding LSA header. An LSA header includes a link state type that indicates the LSA's format (e.g., indicates the LSA describes a routing element or a network), a link state identifier (ID) that identifies the portion of the network described by the LSA, and a routing element identifier (ID) of the originating routing element. The LSA header also includes a link state (LS) age of the LSA, where the LS age is set to zero (0) when the LSA is originated. The LSA continues to age as it is held in link state database 130, and is flushed (or removed) from link state database 130 once the LS age reaches maximum value MAX-AGE. The LSA header also includes a link state (LS) sequence number, such as a signed 32-bit integer, that is used to detect old (or stale) and duplicate LSAs. An LSA header of a new LSA includes an LS sequence number starting at an initial value (e.g., 0x80000001 as the smallest sequence number), which is incremented for each subsequent (newer) version of the LSA. To aid in understanding, LS sequence numbers discussed herein more simply start at an initial value of one (1). Thus, a larger LS sequence number indicates a more recent (or a newer version) LSA.

As LSAs are exchanged among routing elements 120(1)-(N) and stored in respective link state databases of those routing elements, the link state databases of each routing element become synchronized (e.g., come to reflect the current topology of the link state network), and thus routing elements 120(1)-(N) converge on a common representation of the network topology of network 105, also referred to herein as convergence. While becoming synchronized, different routing elements may have different (transient) views of the network topology before convergence is complete, which affects the routing information generated from the link state information stored in the link state databases.

Using the link state (or topology) information stored in link state database 130, each routing element independently computes the shortest path (also referred to herein as the best path), based on metric cost(s), from itself to each other destination (e.g., another routing element 120 or a network 115) in network 105, using, for example, a shortest path algorithm (e.g., Dijkstra's algorithm). Metric costs can be assigned by a network administrator and, for example, typically reflect the preference of using a particular link or routing element interface coupled to the link. Metric costs can reflect, for example, bandwidth, delay, availability and/or reliability factors. The computed shortest paths form a shortest path tree that provides a loop-free path from a computing routing element (or the routing element that computes the shortest paths) to each other destination in network 105. The shortest paths are then used to generate routing information 140 that can be used to reach each destination in network 105. If multiple shortest paths to a destination exist, one path is selected as the primary path. Each routing element stores routing information 140 in one or more routing and/or forwarding tables configured on the routing element.

A routing element may reload (e.g., reboot the routing element's software) or restart (e.g., a hard restart, such as turning the routing element off and back on to reboot the routing element) according to a maintenance schedule (e.g., a reload is scheduled at a particular time and day or after the software of the routing element has been modified or upgraded) or when recovering from a failure (e.g., a power failure, a software failure, a network failure, or other failure). A routing element that has reloaded or restarted is herein described as a reload (or reloaded) routing element. Conventionally, after a routing element has reloaded or restarted, the (reload) routing element forms an adjacency with a neighbor routing element. Once the adjacency is formed, the reload routing element overwrites or flushes any stale link state information that was previously originated by the reload routing element (e.g., that were originated before the reload/restart). However, until the stale link state information is overwritten or flushed, a neighbor routing element may continue to use stale routing information generated from the stale link state information to perform packet forwarding to the reload routing element (e.g., the stale routing information reflects an older network topology rather than the current network topology). If the routing information is no longer valid, transient packet loss can occur.

Embodiments of the technique described herein can be implemented in reload logic module 160, which may be configured on one or more routing elements 120(1)-(N). Reload logic module 160 is a lightweight extension to link state protocol logic. Reload logic module 160 is configured to implement a link state information correction scheme, which in some embodiments can minimize transient packet loss due to stale routing information (e.g., routing information that reflects an older network topology rather than the current network topology). Minimization of transient packet loss is a goal of certain embodiments, although such minimization may or may not be achieved in a given implementation.

Reload logic module 160 is configured to correct a neighbor routing element's stale link state information (and thus also to correct the neighbor's stale routing information) by sending updated or new link state information to the neighbor during adjacency formation, rather than afterwards. Reload logic module 160 is also configured to prevent adjacency formation from completing with a neighbor routing element until the neighbor routing element has received the updated or new link state information. Functionality provided by embodiments of reload logic module 160 is discussed in further detail below.

Networks 115(1)-(N) are representative of networks included in network 105. Each network 115 can be identified by an IP address, such as an IPv4 or an IPv6 address (e.g., identified by a network portion of an IP address, using a subnet mask). Examples of networks 115(1)-(N) include a local area network (LAN) utilizing Ethernet, IEEE 802.11x, or some other communications protocol. In light of the present disclosure, it will be appreciated that network 105 and networks 115(1)-(N) can include other components such as routers, firewalls and the like that are not germane to the discussion of the present disclosure and will not be discussed further herein. It will also be appreciated that other configurations are possible. For example, a much larger number of routing elements 120(1)-(N) and/or networks 115(1)-(N) than the number shown can be implemented in network 105, and so on.

The letter N is used to indicate a variable number of devices or components. For example, a variable number of routing elements 120(1)-(N) and networks 115(1)-(N) are implemented in the network. Although the letter N is used in describing a variable number of instances of each of these different devices and components, a repeated use of the letter N does not necessarily indicate that each device and component has a same number of N instances implemented in the network.

Figure 2:
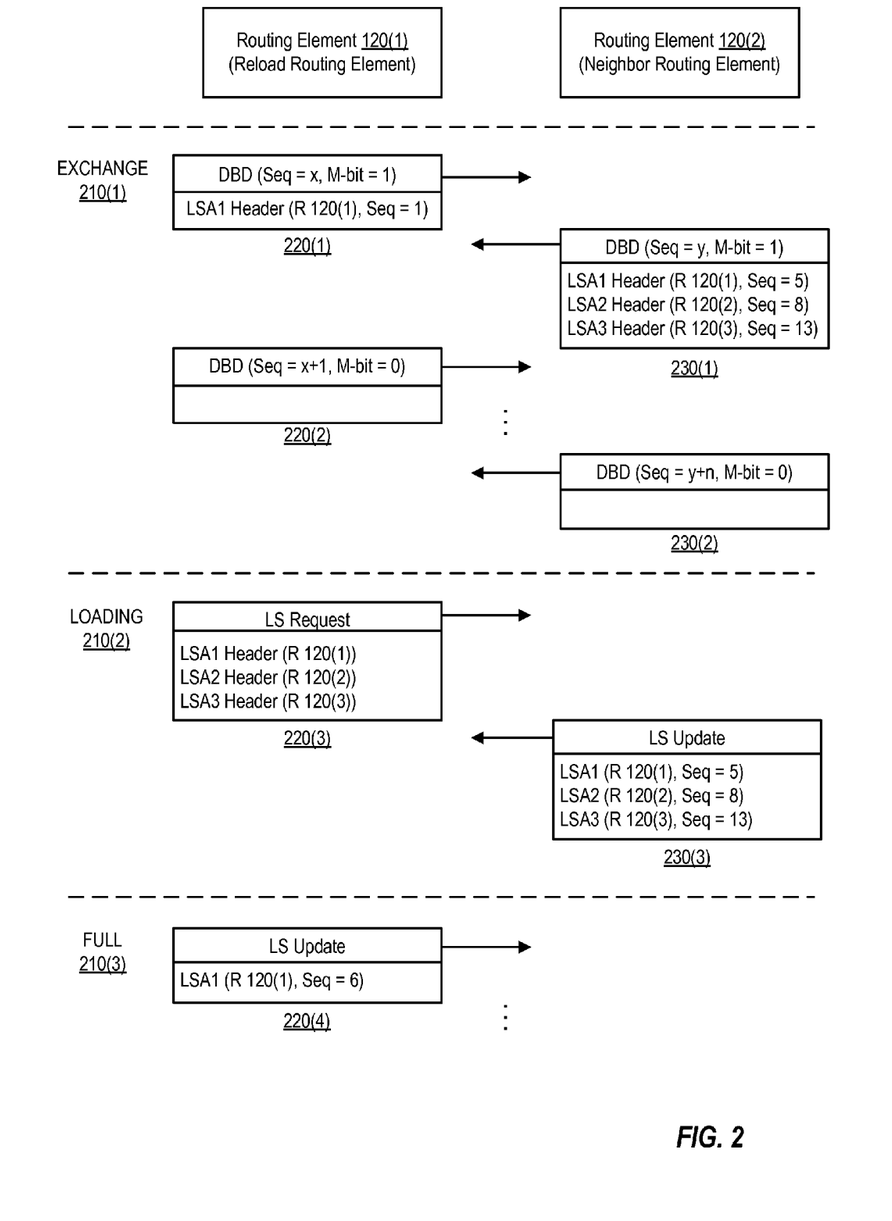
FIG. 2 is a block diagram illustrating example link state messages exchanged during an example adjacency formation session, according to one embodiment.

FIG. 2 is a block diagram illustrating example link state messages exchanged during an example adjacency formation session between a reload routing element (e.g., routing element 120(1)) and a neighbor routing element (e.g., routing element 120(2)). The reload routing element is a routing element that has recovered from a restart or reload (e.g., routing element 120(1) was previously online, subsequently went offline due to a restart/reload condition, and currently is back online). The neighbor routing element is communicatively coupled or connected to the reload routing element, and is also (more simply) referred to as neighbor. Routing elements 120(1) and 120(2) are respectively configured with link state protocol modules 150(1) and 150(2), link state databases 130(1) and 130(2), and routing information 140(1) and 140(2). Link state protocol modules 150(1) and 150(2) are responsible for generating and sending any outgoing link state messages or processing any incoming link state messages (e.g., link state hellos, database descriptor messages, link state updates that include link state advertisements, link state requests, and/or link state acknowledgements). Link state messages 220(1)-(4) and 230(1)-(3) are representative of link state messages exchanged between routing elements 120(1) and 120(2), and as such are not meant to indicate that only the illustrated link state messages are exchanged (e.g., other link state messages are also exchanged, although not shown).

Prior to the reload/restart, link state protocol module 150(1) configured on routing element 120(1) originated one or more LSAs (which are also referred to as LSAs originated by the reload routing element), which are currently stored in the link state database 130(2) of routing element 120(2). Due to the restart/reload, the reload routing element's knowledge of any previously self-originated LSAs has been cleared (e.g., link state database 130(1) is empty). When the reload routing element comes back online, the reload routing element originates at least one LSA with an initial LS sequence number of one (1) and updates its link state database 130(1) with the new LSA(s). To aid in understanding, an example LSA originated by routing element 120(1) is referred to as LSA1.

Before the restart/reload, the neighbor routing element received the reload routing element's previously generated version of LSA1, which has a sequence number that is greater than 1. Since the reload routing element's new version of LSA1 has a sequence number of 1, the new version of LSA1 appears to be older than the neighbor's version of LSA1. In response, the neighbor ignores the new version of LSA1 and continues to store the previously generated version of LSA1, which includes stale link state information (e.g., link state information that describes network topology as it existed before the reload/restart). While the reload routing element could set the new version of LSA1 to MAXAGE to ensure that the neighbor routing element would discard or flush any older versions of LSA1, the neighbor routing element would also discard the new version of LSA1 (due to having MAX-AGE) and thus would still lack the reload routing element's current link state information. Thus, merely setting new LSAs with an LS age of MAXAGE would still result in transient packet loss until another (new) version of LSA1 with current link state information (and not set at MAXAGE) is originated by the reload routing element, which occurs after the adjacency has been formed with the neighbor routing element.

Link state protocol module 150(1) also initiates adjacency formation with routing element 120(2). Routing elements 120(1) and 120(2) exchange link state messages (such as link state hello messages and/or database descriptor messages) and negotiate a two-way communication relationship (not shown) as part of the adjacency formation process.

Once the two-way communication relationship is negotiated, routing elements 120(1) and 120(2) continue to a database exchange phase of the adjacency formation process, illustrated as exchange state 210(1). During exchange state 210(1), routing elements 120(1) and 120(2) respectively describe the entirety of link state database 130(1) and 130(2) to one another using one or more database descriptor messages (also referred to herein as DBDs or DBD messages). A database descriptor message includes a routing element ID of the routing element that generates or originates the DBD. A database descriptor message can also include one or more LSA headers, where each LSA header identifies a corresponding LSA stored in the link state database of the originating routing element. A database descriptor message also includes a DBD sequence number that sequences the one or more DBD messages that describe the originating routing element's link state database. A first DBD includes a DBD sequence number starting at an initial value (e.g., one), which is incremented for each subsequent DBD.

A database descriptor message also includes an M-bit (or more-bit) that indicates whether additional link state information from the originating routing element's link state database (e.g., additional LSA headers that identify LSAs stored in the link state database) should be expected in a subsequent DBD during the adjacency formation session. For example, a set M-bit or high M-bit (1) indicates more LSA headers are to follow in a subsequent DBD, while a cleared M-bit or low M-bit (0) indicates that LSA headers of all LSAs stored in the link state database have been sent and that the originating routing element has completed the database exchange. One or more empty DBD messages, which include no LSA headers, can also be sent after the originating routing element has completed the database exchange. Since a routing element may be involved in several adjacency formation sessions with different neighbors, the routing element has an M-bit associated with each session, where each session is independent of the others.

In the embodiment illustrated, the reload routing element (or routing element 120(1)) generates at least one DBD 220(1) to describe its link state database 130(1) and sends DBD 220(1) to the neighbor routing element (or routing element 120(2)). DBD 220(1) includes an LSA header that identifies the (at least one) self-originated LSA1 stored in link state database 130(1), where the header of LSA1 (also to referred as LSA1 header) includes the reload routing element's ID of R 120(1) and LS sequence number of 1. Also, DBD 220(1) includes a set M-bit (e.g., set high or 1), but the M-bit could also be cleared (e.g., set low or 0) if no other LSA headers needed to be sent (e.g., if link state database 130(1) was fully described in DBD 220(1)).

The neighbor routing element also generates at least one DBD 230(1) to describe its link state database 130(2) and sends DBD 230(1) to the reload routing element. DBD 230(1) includes an LSA header for each LSA stored in link state database 130(2). As illustrated, DBD 230(1) includes LSA1 header that identifies a version of LSA1 that was previously generated by the reload routing element before the reload/restart. The LSA1 header listed in DBD 230(1) includes routing element ID R 120(1) and LS sequence number of 5. DBD 230(1) also includes a set M-bit indicating another DBD with additional LSA headers will follow.

Routing elements 120(1) and 120(2) continue generating and sending DBDs until the respective link state databases have been fully described (e.g., all LSA headers have been sent). In the embodiment illustrated, routing elements 120(1) and 120(2) indicate completion of the database exchange by respectively sending empty DBDs 220(2) and 230(2) (e.g., the DBDs do not contain any LSA headers) with the M-bit set low (0) to indicate all LSA headers have been sent from the respective routing element.

Once both routing elements have completed describing its respective link state database, routing elements 120(1) and 120(2) enter a loading phase of the adjacency formation process, illustrated as loading state 210(2). During loading state 210(2), each routing element requests a full copy of any LSAs that the routing element does not have in its link state database, which includes requesting full copies of any newer versions of LSA(s) to replace the older LSA(s) that the routing element has in its link state database. A routing element requests such full copies by sending a link state request message (also referred to herein as an LS request) that includes the LSA headers identifying the requested LSAs.

In the embodiment illustrated, the reload routing element sends an LS request 220(3) that includes the LSA1 header identifying the previously generated version of LSA1, since the greater sequence number of 5 indicates the version of LSA1 stored in link state database 130(2) is a newer version than the LSA1 stored in link state database 130(1). However, the previously generated version of LSA1 actually contains stale link state information (e.g., link state information that reflects network topology as it existed before the reload/restart). The reload routing element also requests LSA2 originated by (neighbor) R 120(2) and LSA3 originated by R 120(3), which are not present in link state database 130(1).

A routing element responds to a received LS request with a link state update (also referred to herein as an LS update), which includes the full copy of the requested LSAs. In the embodiment illustrated, routing element 120(2) sends an LS update 230(3) with a full copy of the requested LSAs. The full copy of requested LSAs are then stored in the link state database of the requesting routing element (e.g., link state database 130(1) of routing element 120(1)).

Once all LS requests have been sent, the routing elements continue to a full adjacency phase of the adjacency formation process, illustrated as full state 210(3). At this point, the reload routing element can re-originate any stale LSAs (e.g., generate a new version of the LSA and flood the new version to one or more neighbors) to replace any stale versions of the LSA (and stale routing information generated from the stale LSAs) that neighbors might have in their respective link state databases. For example, routing element 120(1) can originate a new version of LSA1 with a sequence number of 6. The reload routing element then floods the new version of LSA1 to the neighbor routing element, which replaces or overwrites the previously generated version of LSA1 (that has a sequence number of 5) in link state database 130(2). The new version of LSA1 can include new link state information, which the neighbor routing element uses to update the neighbor's routing information 140(2). For example, LSA1 can include link state information that reflects the current local topology of the reload routing element, where the local network topology before the reload is different from the local network topology after the reload (e.g., configuration of the links and routing elements coupled to the reload routing element has changed).

The new version of LSA1 can also be used to flush any stale LSAs (and stale routing information) that neighbors might have. For example, a network or other routing element that was present in the local topology before the reload is no longer present after the reload. The new version of LSA1 can include an LS age of maximum value (or MAXAGE). The receiving routing element, or neighbor routing element, recognizes the MAXAGE of LSA1 and removes the corresponding LSA1 from its link state database 130(2). Removing link state information also affects the neighbor's routing information 140.

Thus, a reload routing element waits to make any corrections to link state information until after the reload and neighbor routing elements have completed the adjacency formation process (e.g., have entered full adjacency state 210(3)). However, until the stale link state information is corrected (e.g., overwritten or flushed from a neighbor routing element's link state database), a neighbor routing element may continue to use stale routing information generated from the stale link state information to perform packet forwarding to the reload routing element while the adjacency formation process occurs. If the routing information is no longer valid, transient packet loss can occur until the neighbor's routing information is updated (e.g., packets forwarded to a no longer existent network or routing element are dropped).

In the simplest terms, systems according to the present disclosure provide for correcting a neighbor's link state information during adjacency formation, rather than afterwards. By correcting link state information sooner (e.g., during the adjacency formation process), the window of time during which transient packet loss may occur can be minimized. One or more of routing elements 120 are configured with reload logic module 160. On a restart or reload of the routing element configured with reload logic module 160, reload logic module 160 is configured to communicate with link state protocol module 150 to detect any stale self-originated LSAs in database descriptor messages received from the neighbor during adjacency formation. Reload logic module 160 triggers link state protocol module 150 to originate a new version of the LSA, which is sent to the neighbor routing element during adjacency formation. The neighbor routing element overwrites or flushes the stale LSA, according to the new version of the LSA. Reload logic module 160 is also configured to prevent adjacency formation from completing until the neighbor routing element has received the new LSAs.

Figure 3A:
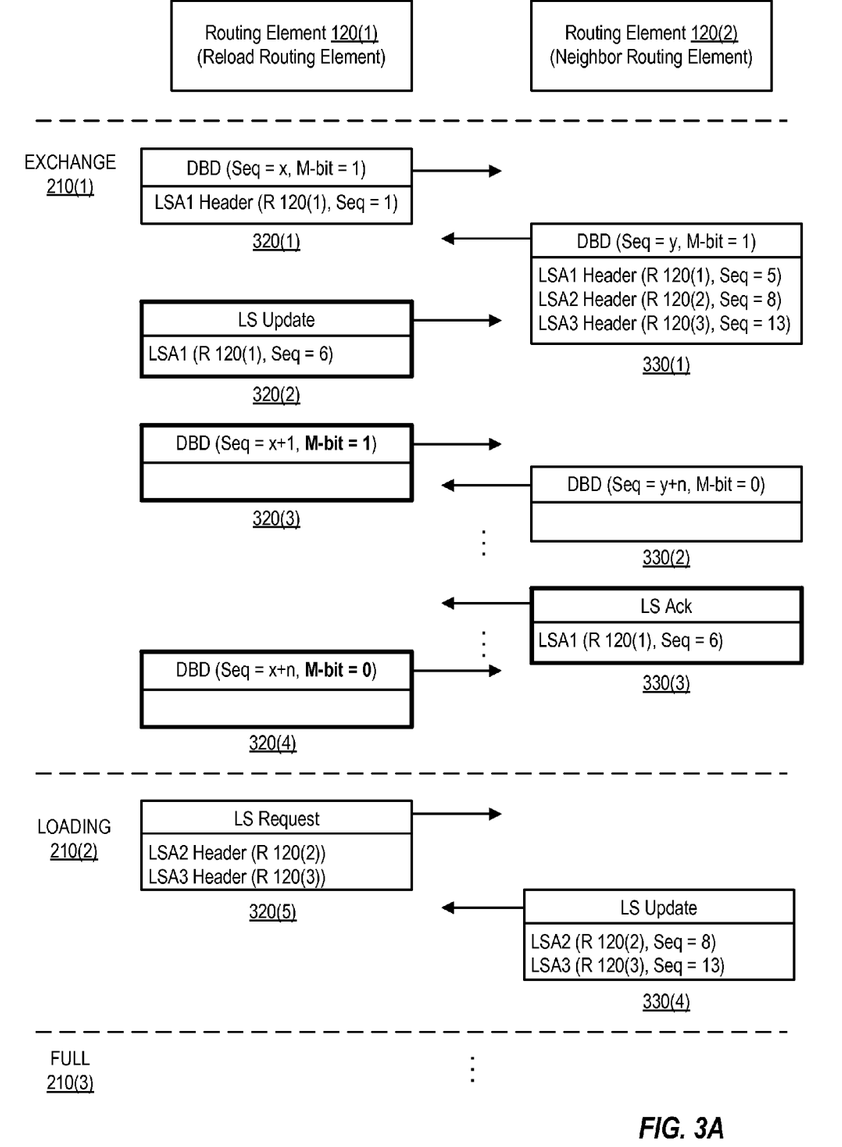
FIG. 3A is a block diagram illustrating example link state messages exchanged according to a link state information correction scheme implemented during an exchange state of an adjacency formation session, according to one embodiment.

FIG. 3A is a block diagram illustrating example link state messages exchanged during an example adjacency formation session according to one embodiment of a link state information correction scheme. The reload routing element (e.g., routing element 120(1)) is now configured with reload logic module 160, which is configured to implement (in cooperation with link state module 150) a link state information correction scheme during the exchange state of the adjacency formation process. The neighbor routing element (e.g., routing element 120(2)) can optionally be configured with another reload logic module, but such configuration does not affect the correction scheme implemented by reload logic module 160 configured on routing element 120(1). Link state messages 320(1)-(5) and 330(1)-(4) are also representative of link state messages exchanged between routing elements 120 (1) and 120(2), and are not meant to indicate that only the illustrated link state messages are exchanged (e.g., other link state messages are also exchanged, although not shown). Link state messages 320(2), 320(3), 320(4), and 330(3) are emphasized to better highlight distinctions from the example adjacency formation session illustrated in FIG. 2.

As described above, the reload routing element and the neighbor routing element exchange database descriptor messages during exchange state 210(1). As DBDs are received from neighbor routing element, reload logic module 160 inspects the DBDs and determines whether the DBDs identify any stale self-originated LSAs. For example, on receipt of the neighbor's DBD 330(1), reload logic module 160 determines that DBD 330(1) includes a first LSA header that identifies R 120(1), which indicates that the LSA (also referred to as LSA1) is self-originated (e.g., originated by routing element 120(1)). Reload logic module 160 also determines that the neighbor's version of LSA1 has a sequence number of 5 (which is greater than the sequence number of 1 of the reload routing element's version of LSA1), which indicates that the neighbor's version of LSA1 was previously generated before the reload/restart of routing element 120(1), and thus is stale (e.g., contains link state information that reflects network topology as it existed before the reload/restart, rather than the current network topology).

If a stale self-originated LSA is identified, reload logic module 160 triggers link state protocol module 150 to re-originate the stale LSA. In other words, link state protocol module 150 generates a new version of the LSA, using an incremented sequence number, and sends the new version of the LSA to the neighbor. In the embodiment illustrated, a new version of LSA1 (with sequence number of 6) is included in LS update 320(2) and sent to routing element 120(2) (and optionally is flooded to all neighbors of the reload routing element, since it is likely that other neighbor routing elements also have stale LSA1). Since the new version of LSA1 includes a sequence number of 6, which is greater than the sequence number of 5 of the neighbor's version of LSA1, routing element 120(2) overwrites the stale version of LSA1 in link state database 130(2) with the new version. Alternatively, the new version of LSA1 can be prematurely aged to MAXAGE, where routing element 120(2) recognizes the new version of LSA1 has aged out and, in response, flushes the stale version of LSA1 from the link state database (or alternatively overwrites the stale version of LSA1 with the new version of LSA1 and immediately flushes the new version of LSA1 from link state database).

Reload logic module 160 continues to inspect DBDs received from the neighbor until the neighbor routing element sends an empty DBD, which notifies the reload routing element that the neighbor's link state database 130(2) has been completely described (and the neighbor has no more LSA headers to share with reload routing element). At this point, any other DBDs received from the neighbor routing element do not need to be inspected since such subsequent DBDs are also empty.

Conventionally, link state protocol module 150 sets reload routing element's M-bit low once link state database 130(1) has been fully described to notify the neighbor that the reload routing element has completed the database exchange (e.g., all LSA headers of LSAs present in link state database 130(1) have been shared with the neighbor). However, reload logic module 160 overrides the conventional link state protocol logic and sets the reload routing element's M-bit high (or M-bit=1) to control the adjacency formation process to remain in exchange state 210(1), even though link state database 130(1) has been fully described. The M-bit remains high until a link state acknowledgement (also referred to as an LS ack) is received by routing element 120(1), where the LS ack acknowledges that the new version of LSA1 has been received by routing element 120(2).

During the time the M-bit remains high, the reload routing element continues to send one or more empty DBDs that do not include any LSA headers, such as DBD 320(3). Each empty DBD includes the reload routing element's M-bit (which is set high), as well as an incremented DBD sequence number. While an empty DBD indicates that the reload routing element has completely described its link state database (and has no more LSA headers to share), the high M-bit in DBD 320(3) indicates to routing element 120(2) that routing element 120(1) has not completed the database exchange and, as a result, controls the neighbor routing element to remain in the exchange state 210(1). Thus, setting the reload routing element's M-bit high prevents routing elements 120(1) and 120(2) from proceeding to loading state 210(2) (and thus prevents the adjacency formation process from completing).

In response to receiving LS ack 330(3), which acknowledges (or corresponds to) the new version of LSA1, reload logic module 160 sets M-bit low (or M-bit=0). The reload routing element can then send an empty DBD 320(4) with low M-bit to notify the neighbor that the reload routing element has completed the database exchange. The remainder of the adjacency formation process continues conventionally, as described above.

In another embodiment of the correction scheme implemented during the exchange state, reload logic module 160 sets the reload routing element's M-bit low in response to receiving an empty DBD from the neighbor routing element, such as DBD 330(2), rather than an LS ack. In such an embodiment, reload logic module 160 trusts that the neighbor routing element will properly process LS update 320(2) (and new version of LSA1) sent by the reload routing element, without requiring receipt of LS ack 330(3) before setting the reload routing element's M-bit low. Thus, when the neighbor routing element sends an empty DBD to notify the reload routing element that the neighbor's link state database has been completely described (and has no more LSA headers to share with the reload routing element), receipt of the empty DBD notifies reload logic module 160 that no other DBDs received from the neighbor routing element need to be inspected (e.g., any subsequent DBDs received from the neighbor are empty). Since all DBDs from the neighbor have been (successfully) inspected for any stale self-originated LSAs (which have been re-originated as the stale LSAs are detected), all link state information corrections have been made to the neighbor's link state database and reload logic module 160 allows the routing elements 120(1) and 120(2) to proceed to the loading state by setting the reload routing element's M-bit low.

The neighbor's M-bit in a received empty DBD may or may not be set low, depending on whether the neighbor is configured with another reload logic module and has recently restarted/reloaded. In such a case, routing elements 120(1) and 120(2) will remain in exchange state 210(1) until each reload logic module has set the respective M-bit low, according to the link state information correction scheme discussed above (e.g., until all LS acks have been received by a respective routing element for its new versions of self-originated LSAs, or alternatively until an empty DBD is received from a respective neighbor). The remainder of the adjacency formation process continues conventionally, as described above.

Figure 3B:
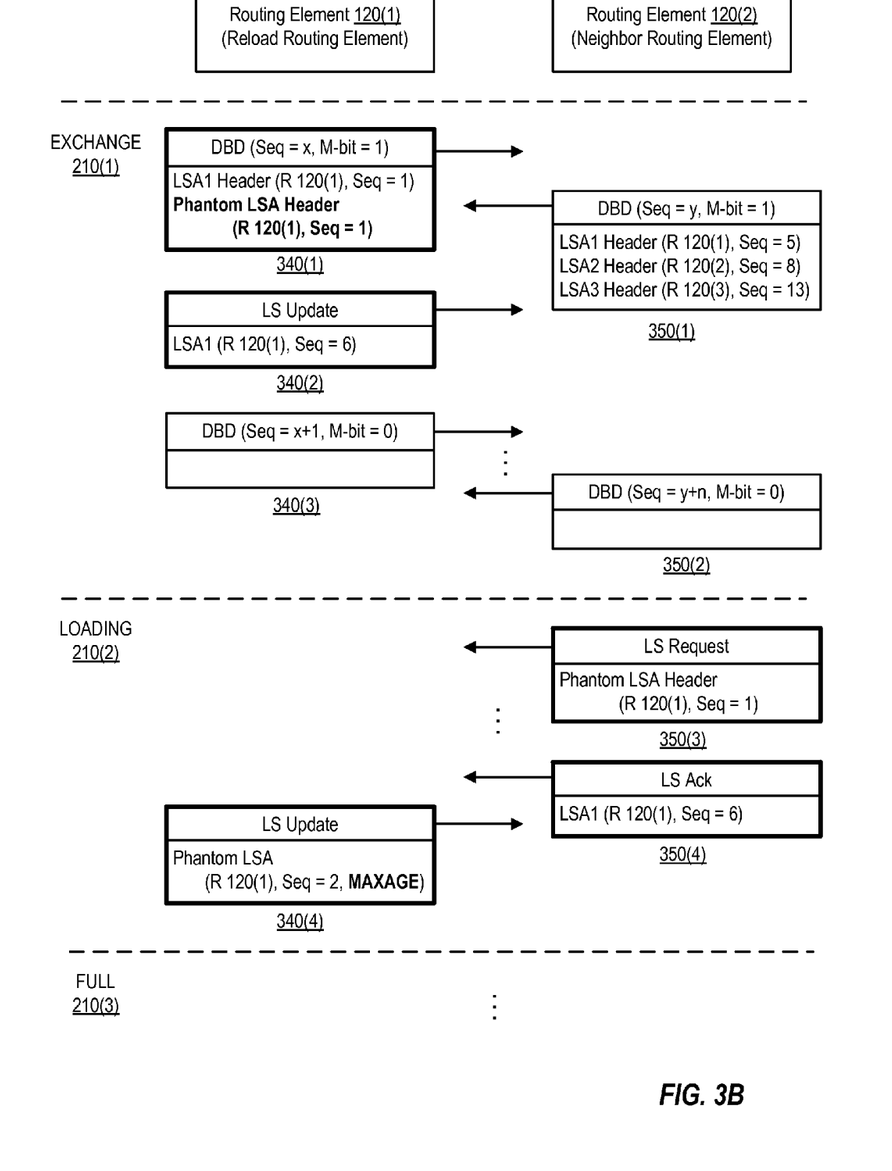
FIG. 3B is a block diagram illustrating example link state messages exchanged according to a link state information correction scheme implemented during a loading state of an adjacency formation session, according to one embodiment.

FIG. 3B is a block diagram illustrating example link state messages exchanged during an example adjacency formation session according to another embodiment of a link state information correction scheme. Routing element 120(1) is configured with reload logic module 160, which is configured to implement (in cooperation with link state module 150) a link state information correction scheme during the loading state of the adjacency formation process. Routing element 120(2) can optionally be configured with another reload logic module, but such configuration does not affect the correction scheme implemented by reload logic module 160 configured on routing element 120(1). Link state messages 340(1)-(4) and 350(1)-(4) are also representative of link state messages exchanged between routing elements 120(1) and 120(2), and are not meant to indicate that only the illustrated link state messages are exchanged (e.g., other link state messages are also exchanged, although not shown). Link state messages 340(1), 340(2), 340(4), 350(3), and 350(4) are emphasized to better highlight distinctions from the example adjacency formation session illustrated in FIG. 2.

In this embodiment of the correction scheme, reload logic module 160 does not override link state protocol logic to affect the reload routing element's M-bit (and thus does not control the adjacency formation process to remain within exchange state 210(1)). Instead, reload logic module 160 triggers link state protocol module 150 to include a false LSA header, or a phantom LSA header that identifies a phantom LSA, in a DBD to the neighbor routing element. The phantom LSA (or false LSA) does not exist because it has never been originated by the reload routing element, although the phantom LSA header indicates the reload routing element is the originating routing element. In the embodiment illustrated, the phantom LSA header is included in the initial DBD 340(1) sent to routing element 120(2).

As described above, the reload routing element and the neighbor routing element exchange database descriptor messages during exchange state 210(1). As DBDs are received from the neighbor routing element, reload logic module 160 inspects the DBDs and determines whether the DBDs identify any stale self-originated LSAs, as described above in connection with FIG. 3A. If a stale self-originated LSA is identified, reload logic module 160 triggers link state protocol module 150 to re-originate the stale LSA, or (in other words) to generate a new version of the LSA and send the new version of the LSA to the neighbor, as also described above in connection with FIG. 3A. In the embodiment illustrated, the reload routing element sends LS update 340(2) that includes the new version of LSA1 to the neighbor routing element. Since reload logic module 160 does not control routing elements 120(1) and 120(2) to remain in exchange state 210(1), both routing elements proceed to loading state 210(2) once the database exchange is complete.

During loading state 210(2), routing element 120(2) requests a full copy of the phantom LSA because the phantom LSA is not present in the neighbor's link state database. Conventionally, link state protocol module 150 responds to an LS request with an LS update including the requested LSA (which, in this case, would result in an error since the requested phantom LSA has not actually been originated). However, reload logic module 160 overrides the conventional link state protocol logic and ignores the LS request for the phantom LSA, such as LS request 350(3), to control the adjacency formation process to remain in loading state 210(2). Reload logic module 160 continues to ignore LS requests for the phantom LSA until an LS ack is received by routing element 120(1), where the LS ack acknowledges that the new version of LSA1 has been received by routing element 120(2). Thus, ignoring the neighbor's outstanding LS request for the phantom LSA prevents routing elements 120(1) and 120(2) from proceeding to full state 210(3) (and thus prevents the adjacency formation process from completing).

In response to receiving LS ack 350(4), which acknowledges (or corresponds to) the new version of LSA1, reload logic module 160 triggers link state protocol module 150 to originate the phantom LSA with a sequence number greater than the sequence number in the phantom LSA header and an LS age of MAXAGE. The phantom LSA can be empty (e.g., does not include any link state information). The phantom LSA is included in an LS update, such as LS update 340(4), and is sent to routing element 120(2) (and is not sent to all neighbor routing elements of the reload routing element, since the phantom LSA is specific to this particular adjacency formation session). In response to receiving the phantom LSA, routing element 120(2) recognizes that the phantom LSA has aged out and, as a result, does not store the phantom LSA in the link state database. Since no LS requests are outstanding, routing elements 120(1) and 120(2) proceed to full state 210(3). The remainder of the adjacency formation process continues conventionally, as described above.

Figure 4A:
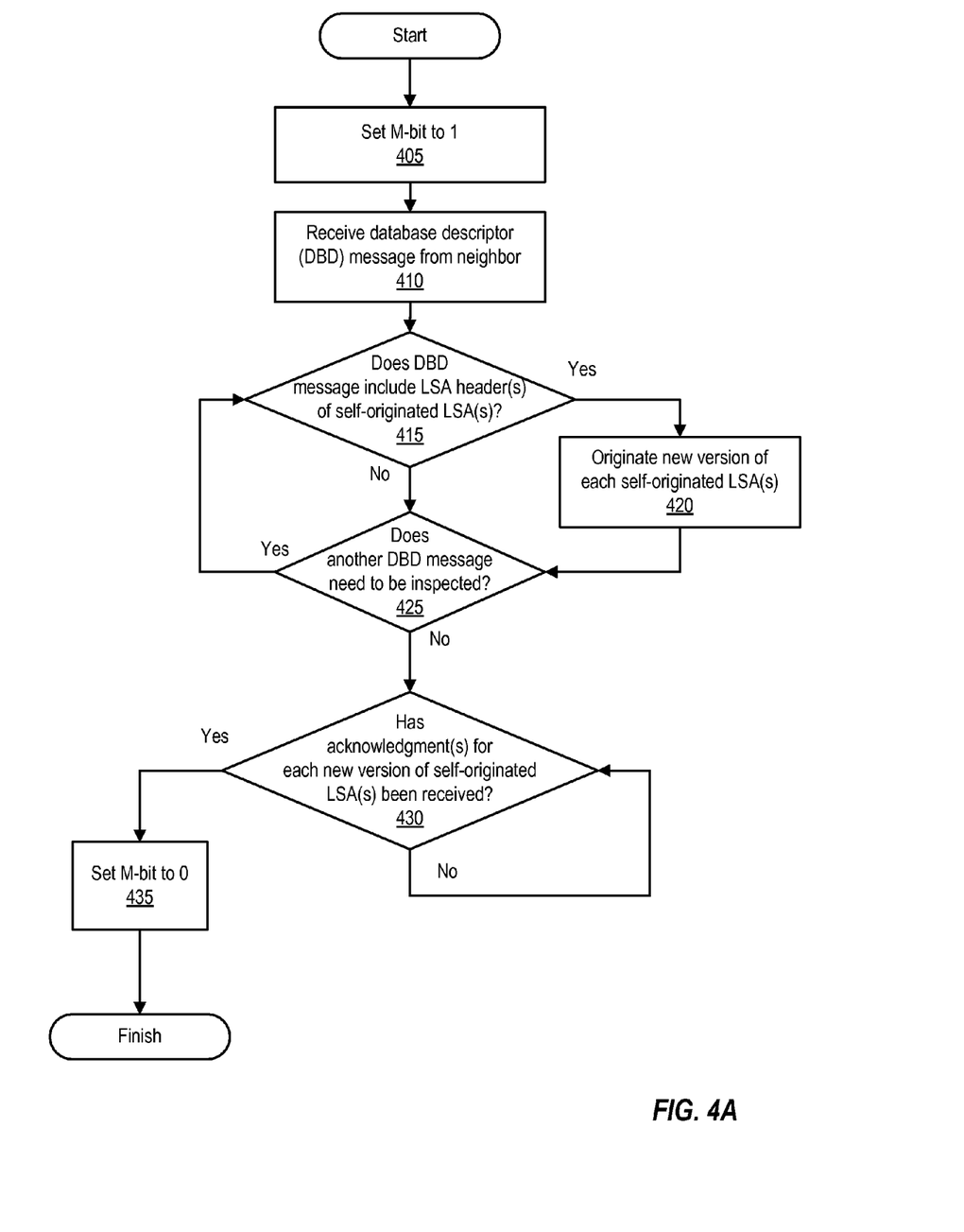
FIG. 4A is a flowchart illustrating acts of an example link state information correction process implemented by a reload logic module during an exchange state of adjacency formation, according to one embodiment.

FIG. 4A is a flowchart illustrating actions performed in executing an example link state information correction process implemented by a reload logic module during an exchange state of adjacency formation. The correction process illustrated in FIG. 4A is implemented by a reload logic module in cooperation with link state protocol logic configured on a particular routing element (also referred to as a reload routing element). The correction process illustrated in FIG. 4A is triggered when an adjacency formation session between the reload routing element (which is now online after a reload/restart) and a neighbor routing element reaches the exchange state. The correction process is also triggered independently for each adjacency formation session between the reload routing element and another neighbor routing element.

The correction process begins at operation 405, where the reload logic module overrides link state protocol logic and sets the reload routing element's M-bit (which is associated with the present adjacency formation session) to one, or high. The M-bit is set high, despite the reload routing element's link state database being completely described. The correction process continues to operation 410, where the reload routing element receives a database descriptor (DBD) message from the neighbor routing element (e.g., receives the DBD message on a port of the reload routing element that is coupled to network 105 that is also coupled to network routing element). The reload logic module can detect that the reload routing element has received a DBD message due to a notification of receipt of the DBD message, or the received DBD message itself (or portion thereof), being routed internally to the reload logic module.

The correction process continues to operation 415, where the reload logic module determines whether the DBD message identifies any stale self-originated LSAs. For example, the reload logic module can determine whether the DBD message includes any LSA headers that identify stale self-originated LSAs. If any stale self-originated LSAs are identified (e.g., LSA header(s) identifying stale self-originated LSA(s) are found in the DBD message), the process continues to operation 420, where the reload logic module triggers the link state protocol module to re-originate the stale LSAs (e.g., to generate a new version of each of the stale self-originated LSAs and to send the new version of the LSAs to the neighbor). Optionally, the new versions of the LSAs are also sent to all other neighbor routing elements of the reload routing element. The correction process then continues to operation 425, discussed further below.

Returning to operation 415, if the received DBD message does not identify any stale self-originated LSAs (e.g., the DBD message does not include any LSA headers that identify stale self-originated LSAs), the correction process then continues to operation 425, where the reload logic module determines whether another DBD message, having been received from the neighbor routing element, needs to be inspected. The reload logic module can detect that a subsequent DBD message is received at the port of the reload routing element coupled to the neighbor routing element, due to a notification of receipt of the subsequent DBD message, or the subsequent DBD message itself (or portion thereof), being routed internally to the reload logic module. The reload logic module can also determine whether the subsequent DBD message needs to be inspected by determining whether the subsequent DBD message is non-empty (e.g., includes one or more LSA headers). If the subsequent DBD is non-empty, the reload logic module determines that the subsequent DBD should be inspected, and the process returns to operation 415.

Returning to operation 425, if the subsequent DBD is empty, the reload logic module determines that the neighbor routing element has completed the database exchange (e.g., all LSA headers of LSAs present in the neighbor's link state database have been shared with the reload routing element). Receipt of the empty DBD notifies the reload logic module that no other DBDs received from the neighbor routing element need to be inspected (since any subsequent DBDs received from the neighbor will be empty), and the correction process continues to operation 430, where the reload logic module determines whether acknowledgements for each new version of the self-originated LSAs have been received. If a new version of a self-originated LSA has not been acknowledged (and thus is still outstanding), the reload logic module returns to operation 430 and continues to wait for receipt of the acknowledgment(s). During this time, the adjacency formation process remains in the exchange state due to M-bit being high. Also during this time, the link state protocol module can periodically send an empty DBD message (with high M-bit) to the neighbor routing element (such as to prevent the adjacency formation session from timing out).

Once the acknowledgments for the self-originated LSAs have been received, the correction process continues to operation 435, where the reload logic module sets the reload routing element's M-bit to zero, or low. At this time, since the reload routing element's M-bit is low (and assuming that the neighbor routing element's M-bit is also low), the adjacency formation process exits the exchange state and is allowed to proceed. The correction process then ends.

In another embodiment of the correction process illustrated in FIG. 4A, the reload logic module can be configured to trust that the neighbor routing element will properly update its link state database, and thus does not need to receive any acknowledgements for the new versions of self-originated LSAs. Instead, after determining that an empty DBD message has been received from the neighbor routing element in operation 425 (which indicates that any further DBDs received from the neighbor routing element are empty and do not need to be inspected, and thus all link state information correction have been made), the correction process continues to operation 435, where the reload routing element's M-bit is set low and the correction process ends.

Figure 4B:
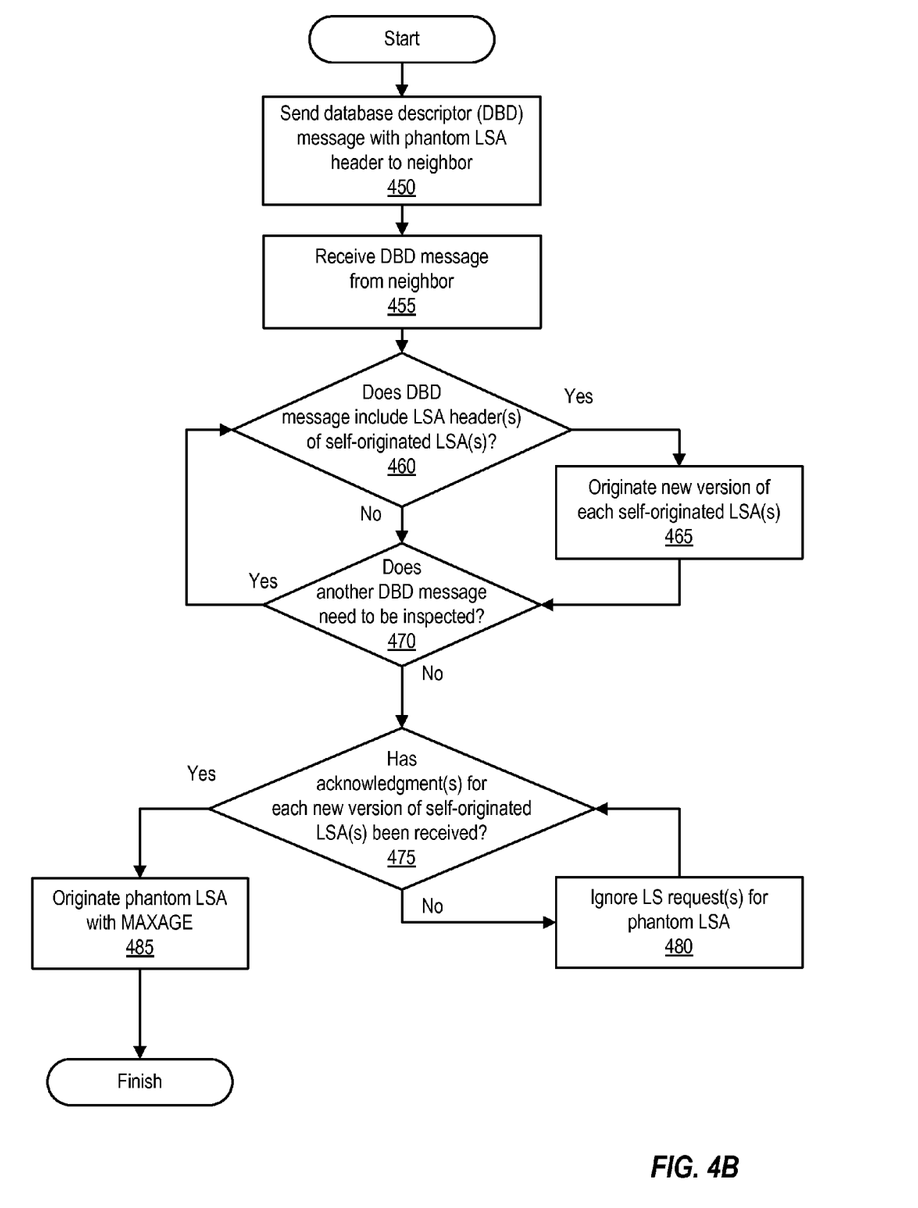
FIG. 4B is a flowchart illustrating acts of an example link state information correction process implemented by a reload logic module during a loading state of adjacency formation, according to one embodiment.

FIG. 4B is a flowchart illustrating actions performed in executing an example link state information correction process implemented by a reload logic module during a loading state of adjacency formation. The correction process illustrated in FIG. 4B is implemented by the reload logic module in cooperation with link state protocol logic configured on a particular routing element (or the reload routing element). The reload logic module can trigger the correction process illustrated in FIG. 4B when an adjacency formation session between the reload routing element and a neighbor routing element reaches the exchange state. The reload logic module can also trigger the correction process independently for each adjacency formation session between the reload routing element and another neighbor routing element.

The correction process begins at operation 450, where the reload logic module triggers the link state protocol module to include a phantom LSA header in a database descriptor (DBD) message sent to the neighbor routing element, as discussed above. The process continues to operation 455, where the reload routing element receives a database descriptor (DBD) message from the neighbor routing element (e.g., receives the DBD message on a port of the reload routing element that is coupled to network 105 that is also coupled to network routing element). The reload logic module can detect that the reload routing element has received a DBD message due to a notification of receipt of the DBD message, or the DBD message itself (or portion thereof), being routed internally to the reload logic module.

The correction process continues to operation 460, where the reload logic module determines whether the received DBD message identifies any stale self-originated LSAs. For example, the reload logic module determines whether the DBD message includes any LSA headers that identify stale self-originated LSAs. If any stale self-originated LSAs are identified (e.g., LSA header(s) identifying stale self-originated LSA(s) are found in the DBD message), the process continues to operation 465, where the reload logic module triggers the link state protocol module to re-originate the stale LSA (e.g., to generate a new version of each of the stale self-originated LSAs and to sent the new version of the LSAs to the neighbor). Optionally, the new versions of the LSAs are also sent to all other neighbor routing elements of the reload routing element. The correction process then continues to operation 470, discussed further below.

Returning to operation 460, if the received DBD message does not identify any stale self-originated LSAs (e.g., the DBD message does not include any LSA headers that identify stale self-originated LSAs), the correction process then continues to operation 470, where the reload logic module determines whether another DBD message that is received from the neighbor routing element needs to be inspected. The reload logic module can detect that a subsequent message is received at the port of the reload routing element coupled to the neighbor routing element, due to a notification of receipt of the subsequent DBD message, or the subsequent BD message itself (or portion thereof), being routed internally to the reload logic module. The reload logic module can also determine whether the subsequent DBD message needs to be inspected by determining whether the subsequent DBD message is non-empty (e.g., includes one or more LSA headers). If the subsequent DBD is non-empty, the reload logic module determines that the subsequent DBD should be inspected, and the process returns to operation 460.

Returning to operation 470, if the subsequent DBD is empty, the reload logic module determines that the neighbor routing element has completed the database exchange (e.g., all LSA headers of LSAs present in the neighbor's link state database have been shared with reload routing element). Receipt of the empty DBD notifies the reload logic that no other DBDs received from the neighbor routing element need to be inspected (since any subsequent DBDs received from the neighbor will be empty), and the correction process continues to operation 475, where the reload logic module determines whether acknowledgements for each new version of the self-originated LSAs have been received. If a new version of a self-originated LSA has not been acknowledged (and thus is still outstanding), the reload logic module returns to operation 475 and continues to wait for receipt of the acknowledgment(s). During this time, the adjacency formation process is controlled to remain in the loading state due to the reload logic module ignoring any LS requests for the phantom LSA in operation 480.

Once all acknowledgments for the self-originated LSAs have been received, the correction process continues to operation 485, where the reload logic module originates the phantom LSA with LS age of MAXAGE (and a sequence number greater than the phantom LSA header's sequence number). In response to receiving the phantom LSA, the neighbor routing element recognizes that the phantom LSA has aged out and does not store the phantom LSA in its link state database. At this time, since no LS requests are outstanding, the adjacency formation process is no longer controlled to remain in the loading state and is allowed to proceed. The correction process then ends.

Figure 5:
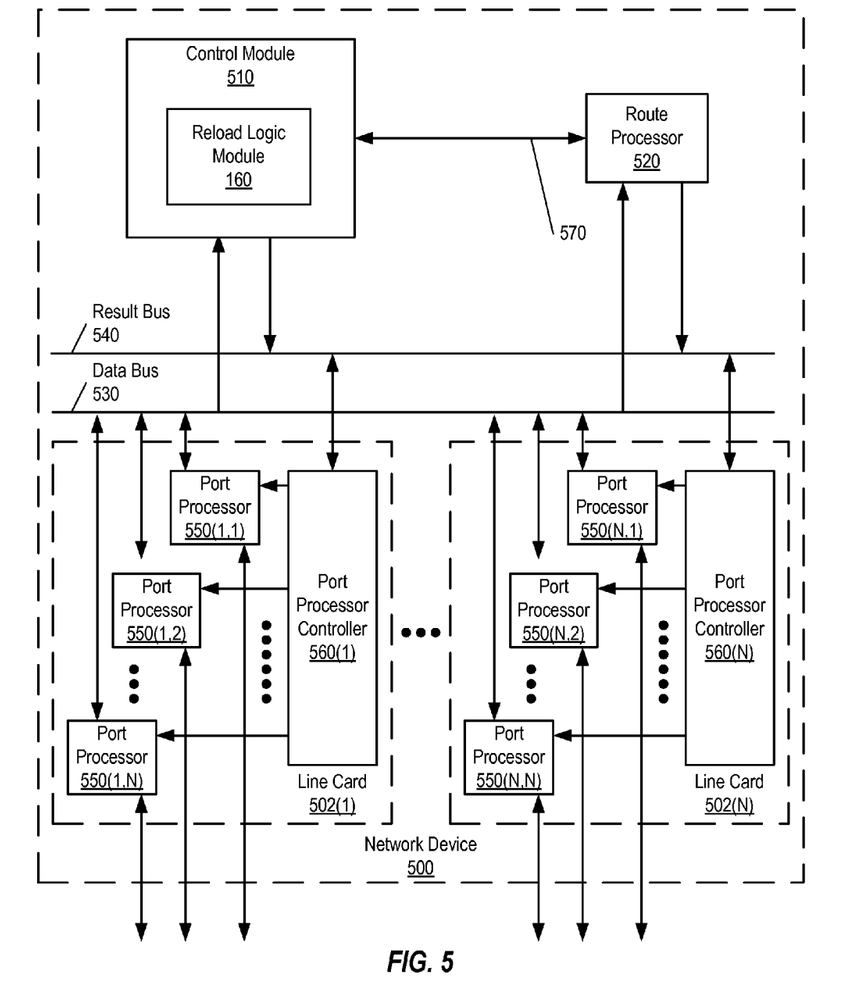
FIG. 5 is a block diagram illustrating components of an example network device in which the present disclosure can be implemented, according to one embodiment.

FIG. 5 is a block diagram illustrating components of an example network device 500 configured as a routing device (e.g., routing elements 120(1)-(N) of FIG. 1). In this depiction, network device 500 includes a number of line cards (line cards 502(1)-502(N)) that are communicatively coupled to a control module 510 (which can include a forwarding engine, not shown) and a route processor 520 via a data bus 530 and a result bus 540. Line cards 502(1)-(N) include a number of port processors 550(1,1)-550(N,N) which are controlled by port processor controllers 560(1)-560(N). It will also be noted that control module 510 and route processor 520 are not only coupled to one another via data bus 530 and result bus 540, but are also communicatively coupled to one another by a communications link 570. It is noted that in alternative embodiments, each line card can include its own forwarding engine.

When a message (e.g., a link state message, such as a database descriptor, a link state update, and/or a link state acknowledgement) is received by a network device such as network device 500 (e.g., received by a reload routing element), the message is identified and analyzed by the network device in the following manner. Upon receipt, a message (or some or all of its control information) is sent, from one of the port processors 550(1,1)-550(N,N) at which the message was received, to one or more of those devices coupled to data bus 530 (e.g., others of port processors 550(1,1)-550(N,N), a forwarding engine, and/or route processor 520). Handling of the message can be determined, for example, by a forwarding engine. For example, a forwarding engine may determine that the message should be forwarded to one or more of port processors 550(1,1)-550(N,N). This can be accomplished by indicating to corresponding one(s) of port processor controllers 560(1)-560(N) that the copy of the message held in the given one(s) of port processors 550(1,1)-550(N,N) should be forwarded to the appropriate one of port processors 550(1,1)-550(N,N).

Network device 500 can implement reload logic module 160 in control module 510 (as shown), or in one of port processor controllers 560(1)-560(N) and/or in route processor 520 in order to implement the present disclosure. Network device 500 can also implement link state routing protocol module 150 (which implements a link state routing protocol such as OSPF or IS-IS) and link state database 130 in control module 510, in one of port processor controllers 560(1)-560(N), and/or in route processor 520 (though some implementations are not shown for the sake of clarity). Routing information 140 can be stored in one or more routing tables and/or forwarding tables, including a routing information base and/or a forwarding information base configured in control module 510, route processor 520, one or more port processor controllers 560(1)-(N), and/or a forwarding engine. Reload logic module 160 is configured to communicate with link state routing protocol module 150 in order to perform (in cooperation with link state routing protocol module 150) a link state information correction process implemented in an exchange state, as described above in connection with FIGS. 3A and 4A, and/or a link state information correction process implemented in a loading state, as described above in connection with FIGS. 3B and 4B.

An incoming message (e.g., a link state message, such as a database descriptor or link state acknowledgment) or portion thereof can be provided to reload logic module 160 and/or link state routing protocol module 150 via a forwarding engine or port processor of a line card coupled to a port that received the incoming message. In one embodiment, an incoming message is intercepted by reload logic module 160 (e.g., the incoming message or portion thereof is provided to reload logic module 160), rather than being provided to link state routing protocol module 150.

An outgoing message (e.g., a link state message, such as a link state update or database descriptor) can also be triggered by reload logic module 160 and generated by link state routing protocol module 150, in response to the incoming message. Link state routing protocol module 150 can provide the outgoing message to a forwarding engine, which can determine that the outgoing message should be forwarded to one or more of port processors 550(1,1)-550(N,N), which can transmit the outgoing message (e.g., transmitted to another network device in network 105).

Figure 6:
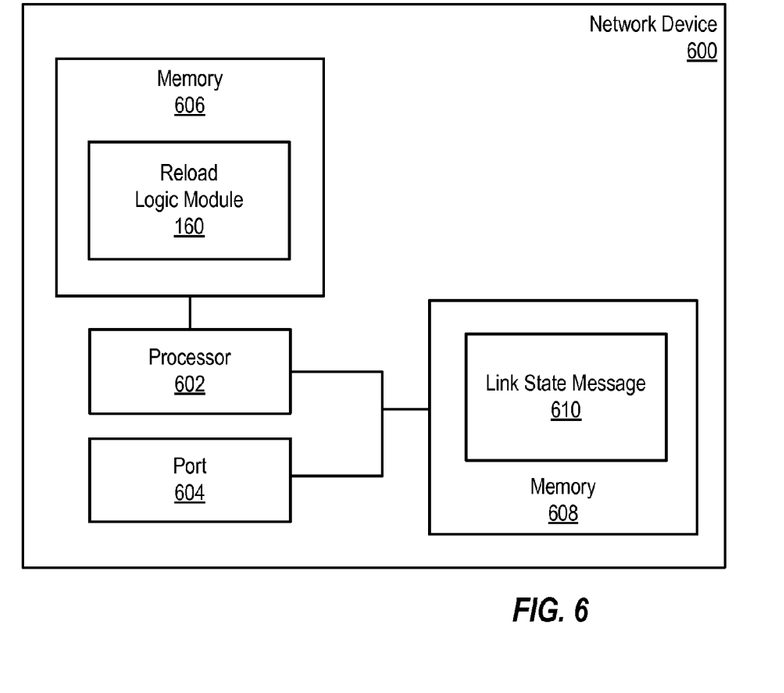
FIG. 6 is a block diagram illustrating components of an example network device in which the present disclosure can be implemented, according to one embodiment.

FIG. 6 is a block diagram illustrating components of an example network device 600, in which the network device is configured as a routing device (e.g., routing elements 120(1)-(N) of FIG. 1). As illustrated, network device 600 includes one or more processors 602 (e.g., microprocessors, PLDs (Programmable Logic Devices), or ASICs (Application Specific Integrated Circuits)) configured to execute program instructions stored in memories 606 and/or 608, which are computer readable storage media. Memories 606 and 608 can include various types of RAM (Random Access Memory), ROM (Read Only Memory), Flash memory, MEMS (Micro Electro-Mechanical Systems) memory, and the like. Network device 600 also includes one or more ports 604 (e.g., one or more hardware ports or other network interfaces that can be linked to other network devices, hosts, servers, storage devices, or the like). Processor 602, port 604, and memories 606 and 608 are coupled to send and receive data and control signals by one or more buses or other interconnects.

In the embodiment illustrated, program instructions executable to implement a reload logic module 160 are stored in memory 606. Program instructions executable to implement a link state routing protocol module 150 can also be stored in memory 606 and/or in memory 608 (not shown). Link state database 130 can be stored in memory 606 or 608 (not shown). Routing information 140 can be stored in one or more routing tables and/or forwarding tables, including a routing information base and/or a forwarding information base configured in memory 606 or 608 (not shown). Reload logic module 160 includes the functionality needed to communicate with link state routing protocol module 150 in order to perform (in cooperation with link state routing protocol module 150) a link state information correction process implemented in an exchange state (as described above in connection with FIGS. 3A and 4A) and/or to perform a link state information correction process implemented in a loading state (as described above in connection with FIGS. 3B and 4B).

Message 610 (e.g., a link state message, such as a database descriptor, link state update, and/or link state acknowledgement) is stored in memory 608. In one embodiment, message 610 can be received from port 604 (e.g., received from another network device coupled to port 604), and can be stored in memory 608 before being provided to reload logic module 160 and/or link state routing protocol module 150. In another embodiment, an outgoing message 610 is generated and stored in memory 608 before being transmitted via port 604 (e.g., transmitted to another network device in network 105 that is coupled to port 604).

As will be appreciated in light of the present disclosure, each of the operations of FIGS. 4A and 4B may be executed by a module (e.g., a software module) or a portion of a module, or a computer system user. Thus, the above-described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store and/or transmit the software modules discussed herein.

Although the present disclosure has been described with respect to specific embodiments thereof, various changes and modifications may be suggested to one skilled in the art. It is intended such changes and modifications fall within the scope of the appended claims.

What is claimed is:

1. A method comprising:
   reloading a reload routing element;
   receiving a database descriptor message at the reload routing element, wherein
      the database descriptor message is received from a neighbor routing element,
      the database descriptor message is received during an adjacency formation, and
      the adjacency formation is performed in response to the reloading;
   determining whether the database descriptor message identifies a stale version of a link state advertisement (LSA), wherein
      the LSA is self-originated by the reload routing element, and
      the determining is performed by the reload routing element during the adjacency formation; and
   generating a new version of the LSA during the adjacency formation.

2. The method of claim 1, further comprising
   sending the new version of the LSA to the neighbor routing element, wherein
      the new version of the LSA is sent by the reload routing element, and
      the new version of the LSA is sent during the adjacency formation.

3. The method of claim 2, further comprising
   determining whether an acknowledgment has been received from the neighbor routing element, wherein
      the acknowledgement corresponds to the new version of the LSA.

4. The method of claim 3, further comprising
   preventing completion of the adjacency formation until the acknowledgement is received.

5. The method of claim 2, wherein
   the new version of the LSA corrects the stale version of the LSA.

6. The method of claim 1, further comprising
   receiving a request for a phantom LSA from the neighbor routing element; and
   preventing completion of the adjacency formation by ignoring the request for the phantom LSA.

7. The method of claim 1, further comprising:
   sending a first database descriptor message to a neighbor routing element, wherein
      the first database descriptor message identifies a phantom LSA,
      the first database descriptor message indicates the phantom LSA as being originated by the reload routing element,
      the phantom LSA is not originated by the reload routing element during or after the reloading, and
      the first database descriptor message is sent by the reload routing element.

8. The method of claim 1, wherein
   the receiving, the determining, and the generating are performed, at least in part, after the reloading.

9. A non-transitory computer readable storage medium configured to store program instructions that, when executed on a processor, are configured to cause the processor to perform a method comprising:
   reloading a reload routing element;
   receiving a database descriptor message at the reload routing element, wherein
      the database descriptor message is received from a neighbor routing element,
      the database descriptor message is received during an adjacency formation, and
      the adjacency formation is performed in response to the reloading;
   determining whether the database descriptor message identifies a stale version of a link state advertisement (LSA), wherein
      the LSA is self-originated by the reload routing element, and
      the determining is performed by the reload routing element during the adjacency formation; and
   generating a new version of the LSA during the adjacency formation.

10. The non-transitory computer readable storage medium of claim 9, the method further comprising
    sending the new version of the LSA to the neighbor routing element, wherein
       the new version of the LSA is sent by the reload routing element, and
       the new version of the LSA is sent during the adjacency formation.

11. The non-transitory computer readable storage medium of claim 10, the method further comprising
    determining whether an acknowledgment has been received from the neighbor routing element, wherein
       the acknowledgement corresponds to the new version of the LSA.

12. The non-transitory computer readable storage medium of claim 11, the method further comprising
    preventing completion of the adjacency formation until the acknowledgement is received.

13. The non-transitory computer readable storage medium of claim 10, wherein
    the new version of the LSA corrects the stale version of the LSA.

14. The non-transitory computer readable storage medium of claim 9, the method further comprising
    receiving a request for a phantom LSA from the neighbor routing element; and
    preventing completion of the adjacency formation by ignoring the request for the phantom LSA.

15. An apparatus comprising:
a processor;
a memory coupled to the processor and configured to store instructions executable by the processor, the instructions configured to
reload a reload routing element;
receive a database descriptor message at the reload routing element, wherein
the database descriptor message is received from a neighbor routing element,
the database descriptor message is received during an adjacency formation, and
the adjacency formation is performed in response to the reload;
determine whether the database descriptor message identifies a stale version of a link state advertisement (LSA), wherein
the LSA is self-originated by the reload routing element, and
the determining is performed by the reload routing element during the adjacency formation; and
generate a new version of the LSA during the adjacency formation.

16. The apparatus of claim 15, the instructions further configured to send the new version of the LSA to the neighbor routing element, wherein
the new version of the LSA is sent by the reload routing element, and
the new version of the LSA is sent during the adjacency formation.

17. The apparatus of claim 16, the instructions further configured to determine whether an acknowledgment has been received from the neighbor routing element, wherein
the acknowledgement corresponds to the new version of the LSA.

18. The apparatus of claim 17, instructions further configured to prevent completion of the adjacency formation until the acknowledgement is received.

19. The apparatus of claim 15, instructions further configured to
receive a request for a phantom LSA from the neighbor routing element; and
ignore the request for the phantom LSA to prevent the adjacency formation from completion.

* * * * *